Oct. 30, 1923.
J. W. BRUNDAGE
1,472,547
SELVAGE EDGE CUTTING MACHINE
Filed Aug. 19, 1920     3 Sheets-Sheet 3
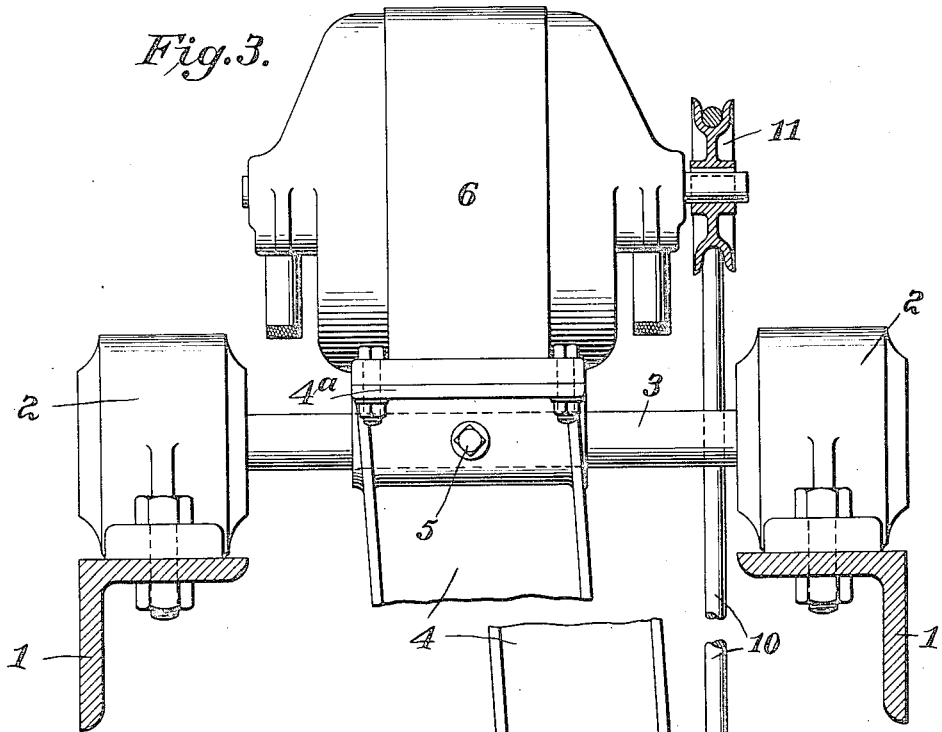
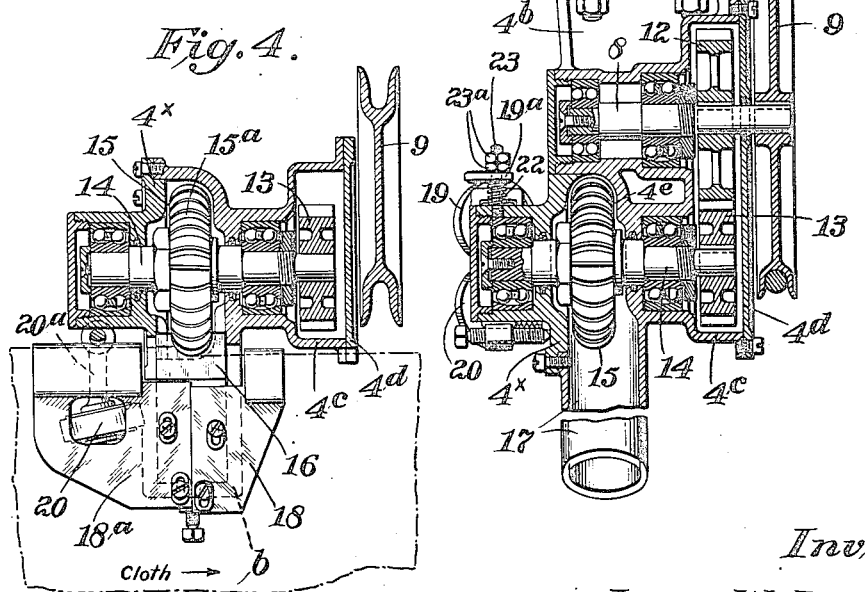
Inventor:
James W. Brundage,
by Spear Middleton Donaldson & Hall
Attys.

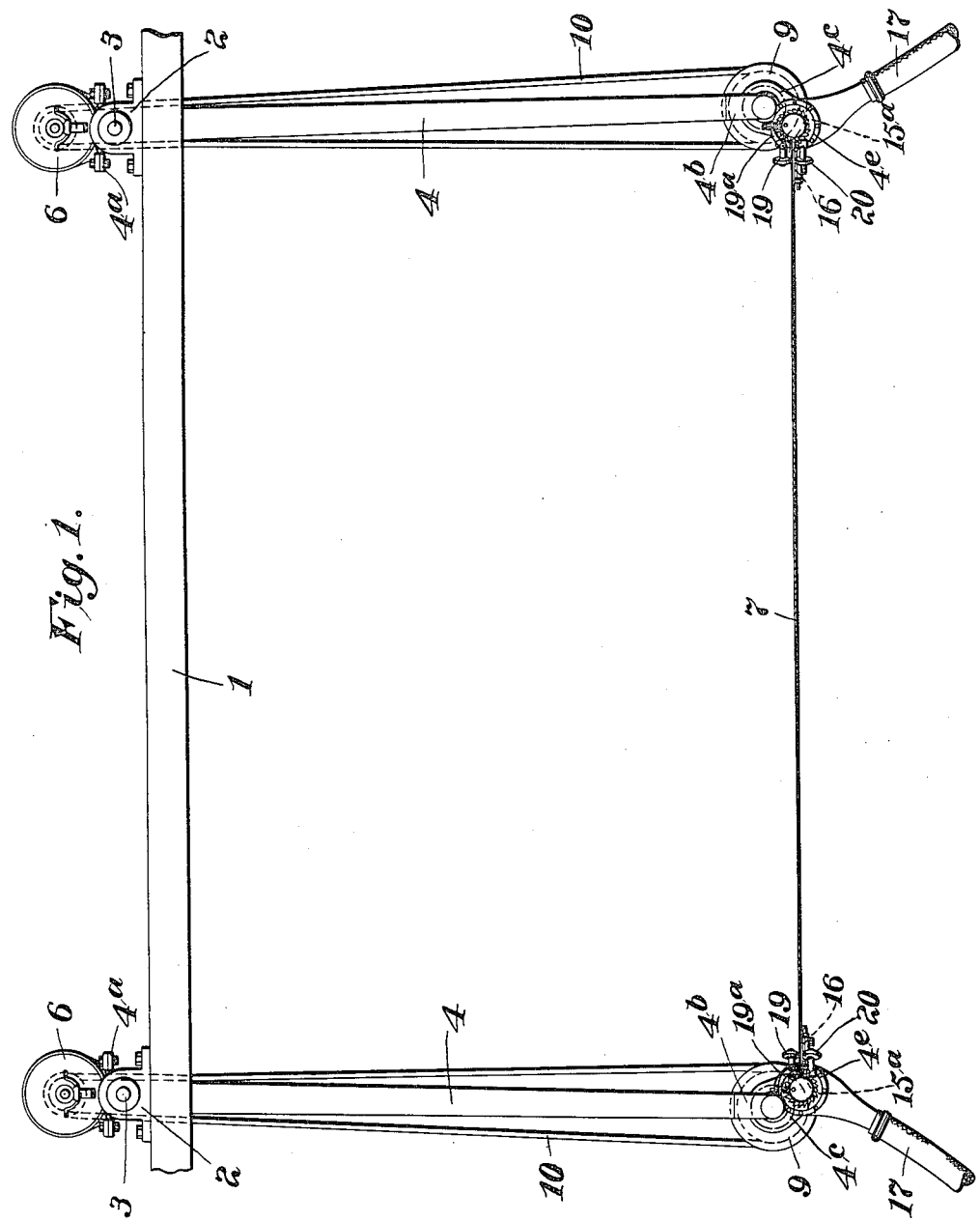

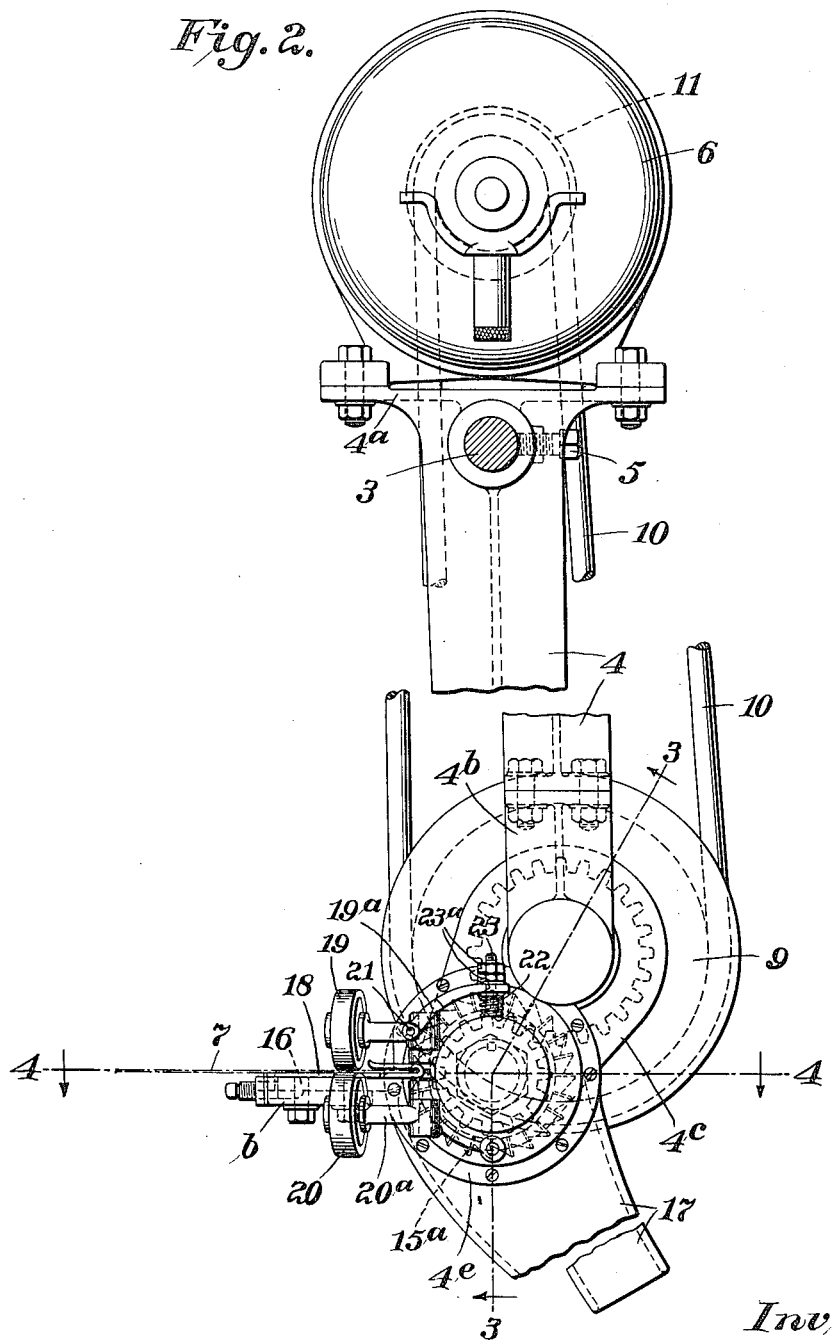

Patented Oct. 30, 1923.

1,472,547

UNITED STATES PATENT OFFICE.

JAMES W. BRUNDAGE, OF AKRON, OHIO, ASSIGNOR TO THE MILLER RUBBER CO., OF AKRON, OHIO, A CORPORATION OF OHIO.

SELVAGE-EDGE-CUTTING MACHINE.

Application filed August 19, 1920. Serial No. 404,526.

*To all whom it may concern:*

Be it known that I, JAMES W. BRUNDAGE, a citizen of the United States, and resident of Akron, Ohio, have invented certain new and useful Improvements in Selvage-Edge-Cutting Machines, of which the following is a specification.

My present invention relates to improvements in machines for trimming the selvage edges from fabrics, such for example as the friction fabric used in the manufacture of pneumatic tires.

The invention aims to provide a simple, economical, durable and efficient apparatus which will accurately trim the selvage edges to the desired amount.

The invention also aims to provide a machine which will remove the trimmed material in comminuted form so as to be in condition to be utilized in the manufacture of various articles such for example as composition soles and heels for boots and shoes.

With these and other objects in view the invention includes the novel features of construction and arrangement and combination of parts hereinafter described and particularly defined by the appended claims.

The preferred embodiment of my invention is illustrated in the accompanying drawings in which:—

Figure 1 is an elevation, largely of a diagrammatic or conventional nature, showing the fabric operated upon in transverse section.

Fig. 2 is an enlarged detail view, partly broken away, of the mechanism at one side (the right hand side Fig. 1).

Fig. 3 is a view of the same partly in elevation and partly in section, the elevation being at right angles to Fig. 2 and the section shown in the lower portion being taken on line 2—2 of Fig. 2 and looking in the direction of the terminal arrows.

Fig. 4 is a section on line 4—4 of Fig. 2 looking downwardly.

Referring by reference characters to these drawings, in which like reference characters denote the same parts throughout the several views, the numerals 1—1 designate spaced frame bars, preferably of angle iron, which are designed to be supported by suitable standards, from any suitable support in proper relation to the fabric feeding apparatus, which, as it forms no part of the present invention and is well known to those skilled in the art, is not shown herein. Bearing brackets or members 2, 2, are bolted or otherwise suitably secured to the frame bars, which bearings support rock shafts 3. As these rock shafts and the parts supported thereby are identical, specific illustration of the said parts on one side will suffice for both, and where the singular term is used in the following description as applied to the mechanism acting on one edge of the fabric it will be understood as being equally descriptive of the companion mechanism cooperating with the other edge.

Supported from the rock shaft 3, is a substantially depending vertical bar or pendulum 4, preferably by having its upper end provided with a transverse passage through which the shaft passes, the upper end of the pendulum 4 being adjustably clamped to the shaft by means such as set screw 5.

The upper end of the pendulum above the shaft is widened out and shaped to form a seat or base as indicated at $4^a$ to which the base of an electric motor 6 is bolted or otherwise suitably secured.

The two pendulums depend towards and into proximity with the opposite edges of the fabric which is indicated at 7 and each pendulum carries at its lower end guiding and trimming mechanism for cooperating with the edge of the fabric. This mechanism is preferably carried by a separately formed pendulum part $4^b$ designed to be bolted or otherwise secured to the main part 4. Said mechanism comprises a shaft 8 which is journaled in suitable anti-friction bearings in the part $4^b$ and is provided at one end with means adapted to be driven from the motor 6, such means being shown as comprising a pulley 9 which is driven by belt 10 from the motor pulley 11. Shaft 8 has fast thereon a gear wheel 12 which meshes with a gear 13 fast on cutter shaft 14, whereby the cutter shaft is rotated, said cutter shaft being journalled in suitable anti friction bearings in part $4^b$.

Preferably the part $4^b$ is shaped to form a gear casing $4^c$ which is provided with a removable cover plate $4^d$.

The part $4^b$ is further shaped to form a cutter chamber $4^e$ within which is located the cutter 15, the periphery of which projects from the cutter chamber at one side sufficiently to act on the corresponding edge of the fabric. The cutter is in the form of a convex toothed wheel or disc, the teeth or cutting members 15ª being designed to cooperate with a fixed knife 16 adjustably carried by a projection or ledge *b* on the part 4ᵇ.

Owing to the toothed formation of the cutter and its rapid rotation on an axis approximately parallel to the edge of the fabric it serves to trim off the edge of the fabric passing over the stationary knife by a succession of bites, the teeth or cutting members acting in succession and removing the independent sections along the margin. The cutter therefore delivers the particles removed in a finely comminuted or divided form capable of use for the purposes hereinbefore referred to without any grinding or analogous treatment. The chamber in which the cutter rotates is provided with an outlet port or passage which communicates with an exhaust pipe 17 in which suction may be produced by any suitable means, through which the particles may be conveyed away and collected in any suitable manner not necessary to be illustrated.

The cutter chamber is provided with a removable side wall or closure member 4ˣ which carries one of the anti-friction bearings for the cutter shaft.

A pair of guides designated 18 and 18ª respectively are located on opposite sides of the cutter and adjustably secured to the upper side of the projection or ledge *b*. These guides are formed of metal plates doubled back upon themselves to provide an intervening space through which the margins of the cloth slide.

One of these guides 18 is arranged so as to be in alignment with the advanced edge of the rotating cutter and guide the trimmed edge of the fabric, while the other is positioned back of the cutting edge so as to guide the untrimmed edge, the distance between the two guides determining the amount of material to be removed.

A pair of cooperating rollers 19 and 20 are arranged respectively above and below the line of travel of the fabric and are rotatable on axes which are inclined to the direction of travel of the fabric, the inclination being such that the rollers tend to urge the fabric towards the guides.

The roller 20 is journalled on an arm 20ª suitably secured to the part 4ᵇ while the roller 19 is journalled on one arm of a bellcrank lever 19ª fulcrumed at 21, the other arm being urged outwardly by a spring 22. The spring encircles a threaded post 23 which passes through an opening in the arm of the bell crank lever and is provided with stop nuts 23ª which may be adjusted to limit the rocking movement. Thus the roller 19 is forced towards the roller 20 with a yielding pressure which is or may be limited by the stop nuts referred to.

When the apparatus as above described is in operation the upper ends of the pendulums are adjusted so that their lower ends would tend by gravity to lie in such position that the distance between the opposed guides 18 would be somewhat less than the width of the untrimmed fabric. The fabric is held under proper tension by its supporting and feeding devices so as to be maintained in a flat and unwrinkled condition in the manner well understood. The two pendulums will be displaced laterally away from each other by the engagement of the guides with the edges of the traveling fabric, and will have a tendency to swing towards each other, thus causing the guides to accurately follow the edges of the fabric and gage the amount of material removed by the cutters.

This force is amplified by the rollers which have a tendency to travel towards each other due to their inclined axes, the rollers being adjusted, in practice, so that the thrust of the fabric towards the guides is barely balanced by their sliding friction on the fabric, there being a continuous slippage between the rollers and the fabric whenever the edge of the fabric contacts with the guides.

It will be noticed that in my construction provision is made for preventing any lubricant from being thrown on the fabric, all the parts requiring lubricant being fully encased, which is a material item. It will also be apparent that by mounting each motor on its corresponding arm, the driving connections are of a direct and simple nature and are unaffected by the swinging of the arms.

Having thus described my invention what I claim is:—

1. In apparatus for trimming the edges of friction tire fabric, a rotary cutter journaled on an axis parallel with the edge of the sheet, having a toothed edge arranged to act on the margin of the fabric, and a gage on each side of the cutter for engaging the edge of the fabric, one of said gages being displaced relative to the other corresponding to the amount removed by the cutter.

2. In combination in apparatus for trimming the straight selvage edges of sheet fabric for use in tires, means for horizontally supporting and feeding the fabric, and trimming means operating from the edge of the fabric inwardly towards the center line of the sheet, and means movable with the cutter bearing on the untrimmed edge of the fabric for limiting the extent to which the trimming means cuts into the fabric.

3. In apparatus for trimming the edges of friction tire fabric, a rotary cutter having a toothed edge arranged to act on the margin of the fabric and mill away successive portions thereof and a gage adjacent said cutter and movable therewith engaging the edge of the fabric to limit the amount of material removed by said cutter.

4. Apparatus of the character described including means for feeding a sheet of material, rotary cutting means movable toward and away from the material being acted on for milling away successive portions thereof, a gage to limit the action of the cutter, said cutter and gage being simultaneously movable.

In testimony whereof, I affix my signature,

JAMES W. BRUNDAGE.